(12) United States Patent
Martinez et al.

(10) Patent No.: US 11,907,372 B2
(45) Date of Patent: Feb. 20, 2024

(54) SYSTEMS AND METHODS FOR MODIFYING SYSTEM PRE-BOOT INTERFACE CONFIGURATION BASED ON USAGE CHARACTERISTICS OF AN INDIVIDUAL INFORMATION HANDLING SYSTEM

(71) Applicant: DELL PRODUCTS L.P., Round Rock, TX (US)

(72) Inventors: Ricardo L. Martinez, Leander, TX (US); Ruhull A. Bhuiyan, Austin, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 883 days.

(21) Appl. No.: 16/927,541

(22) Filed: Jul. 13, 2020

(65) Prior Publication Data

US 2022/0012339 A1 Jan. 13, 2022

(51) Int. Cl.
*G06F 21/57* (2013.01)
*G06F 9/4401* (2018.01)
*G06F 11/30* (2006.01)
*G06F 3/0482* (2013.01)
*G06F 11/34* (2006.01)

(52) U.S. Cl.
CPC .......... *G06F 21/572* (2013.01); *G06F 3/0482* (2013.01); *G06F 9/441* (2013.01); *G06F 9/4406* (2013.01); *G06F 9/4418* (2013.01); *G06F 11/3006* (2013.01); *G06F 11/3419* (2013.01); *G06F 2221/033* (2013.01)

(58) Field of Classification Search
CPC .... G06F 21/572; G06F 3/0482; G06F 9/4406; G06F 9/441; G06F 9/4418; G06F 11/3006; G06F 11/3419; G06F 2221/033; G06F 9/44505; G06F 11/3409; G06F 21/575

See application file for complete search history.

(56) References Cited

U.S. PATENT DOCUMENTS

| | | | |
|---|---|---|---|
| 10,691,509 B2 * | 6/2020 | Tyebkhan | G06F 16/13 |
| 2012/0185776 A1 * | 7/2012 | Kirshenbaum | G06F 9/5094 |
| | | | 715/735 |
| 2014/0122859 A1 * | 5/2014 | Ruelas | G06F 21/572 |
| | | | 713/2 |

(Continued)

OTHER PUBLICATIONS

Wikipedia, "BIOS", Printed from Internet Jul. 7, 2020, 22 pgs.

(Continued)

*Primary Examiner* — Zhipeng Wang
(74) *Attorney, Agent, or Firm* — Egan, Enders & Huston LLP.

(57) ABSTRACT

Systems and methods are provided that may be implemented to monitor unique usage characteristics (e.g., system device usage) of an individual information handling system, and to determine a unique system pre-boot interface (PBI) configuration for the individual information handling system based on these monitored unique usage characteristics. The provided systems and methods may also be implemented to automatically update pre-boot interface security configuration for system devices based on the monitored usage characteristics of the individual information handling system.

33 Claims, 3 Drawing Sheets

(56) References Cited

U.S. PATENT DOCUMENTS

2020/0364342 A1* 11/2020 Martinez ................. G06F 21/50
2021/0182080 A1*  6/2021 Guo .................... G06F 9/44505

OTHER PUBLICATIONS

Limonciello et al., "Systems and Methods for Collecting Deep Operating System (OS) Telemetry", U.S. Appl. No. 16/859,031, filed Apr. 27, 2020, DELL:290, 34 pgs.
Wikipedia, "Protection Ring", Printed from Internet Jul. 7, 2020, 8 pgs.
Wikipedia, "Unified Extensible Firmware Interface", Printed from Internet Jul. 7, 2020, 24 pgs.

* cited by examiner

SYSTEMS AND METHODS FOR MODIFYING SYSTEM PRE-BOOT INTERFACE CONFIGURATION BASED ON USAGE CHARACTERISTICS OF AN INDIVIDUAL INFORMATION HANDLING SYSTEM

FIELD OF THE INVENTION

This application relates to information handling systems and, more particularly, to pre-boot interface configurations on information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems of the same type are typically manufactured and shipped to end users with a default basic input/output system (BIOS) or unified extensible firmware interface (UEFI) configuration that is identical for all end users, and that is independent of the usage model of any given end user. Different post-delivery BIOS configuration changes related to system security must then be independently set on different computer systems by the different end users in an ad-hoc or reactive manner based on limited (or no) security/risk information, and configuration policies are often outdated. Individual system devices that must be manually configured by the system end user include Universal Serial Bus (USB), camera, Thunderbolt bus, WiFi connection port, local area network (LAN) port, microphone, Bluetooth connection port, near field communication (NFC) connection port, and fingerprint reader (FPR). Moreover, devices and ports available on an information handling system such as a general purpose personal computer (PC) may be unnecessarily exposed for additional threat/attack surface when a shipped system is left in a default state with BIOS configuration definitions that are created by system manufacturers rather than the system end user.

SUMMARY OF THE INVENTION

Systems and methods are disclosed herein that may be implemented to monitor unique usage characteristics (e.g., usage model) of an individual information handling system, and to determine a unique system pre-boot interface configuration for the individual information handling system based on the monitored unique usage characteristics of the individual information handling system. Examples of such monitored usage characteristics include, but are not limited to, usage of particular system devices, operating system (OS) usage, and/or application usage on the individual information handling system. Examples of a determined unique system pre-boot interface configuration include, but are not limited to, custom pre-boot interface configurations specific to system device/s, software/firmware component/s, port enablement/s, etc. A pre-boot interface may include any firmware and/or software that executes on an information handling system platform to provide a configurable pre-boot interface between the system OS and system hardware and firmware of the information handling system platform. Examples of specific such pre-boot interfaces include, but are not limited to, basic input/output system (BIOS), unified extensible firmware interface (UEFI), Coreboot, Linuxboot, etc.

In one embodiment, a unique system pre-boot interface configuration may be so determined and implemented on an individual information handling system in a manner that improves security and privacy of the system pre-boot interface configuration on the individual information handling system by, for example, disabling non-used or infrequently-used system devices that present risk to data security and/or user privacy. In one embodiment, the disclosed systems and methods may be implemented to provide an automated way to update pre-boot interface security configuration based on monitored usage of system devices including, but not limited to, usage of data bus ports such as Universal Serial Bus (USB) port or Thunderbolt bus port to access downstream system devices connected to such data bus ports, as well as usage of specific system devices such as camera, local area network (LAN) port, wireless LAN (e.g., 802.11x WiFi) port, microphone, Bluetooth connection port, near field communication (NFC) connection port, fingerprint reader (FPR), touchpad, etc.

The disclosed systems and methods may be implemented in one embodiment to select and recommend a determined unique system pre-boot interface configuration for an individual information handling system based on monitored unique usage characteristics of the individual information handling system. For example, OS notifications, "toast" notifications, or an application may be utilized to recommend or suggest to a system user a unique and more secure pre-boot interface configuration based on analysis of the monitored unique usage characteristics (e.g., usage model) of the individual information handling system. In such an embodiment, the system user may implement the recommended unique system pre-boot interface configuration, e.g., by making changes to the system pre-boot interface settings of the individual information handling system. In a further embodiment, transition to the recommended unique system pre-boot interface configuration on the individual information handling system may be automated by presenting (e.g., displaying) an input option to the system user (e.g., such as a "make this change" button) that interfaces with a pre-boot interface management API to automatically transition to the recommended unique and more secure system pre-boot interface configuration that is made active on the next system boot.

Using the disclosed systems and methods, a "secure by default" or default secure system pre-boot interface state may be continuously maintained and updated on a user-specific basis for an individual information handling system based on how that individual information handling system is being used. Advantageously, this default secure system pre-boot interface state may be implemented to be more secure than a system manufacturer or OEM-derived or factory default state with which a conventional information handling system is provided when shipped to the end user, and may be advantageously implemented to maintain the lowest possible attack surface on the individual information handling system based on system user need. In this way, a most secure system pre-boot interface state configuration may be determined on a per-user basis by monitoring individual user behavior (e.g., based on OS usage and/or end user system usage). The system user may then be made aware of the more secure system pre-boot interface configuration through security-specific recommendations made in the OS or otherwise communicated to the system user as needed throughout the operating life of the individual information handling system.

In one exemplary embodiment, security risk context evaluation for an individual information handling system may occur at the OS level, and system pre-boot interface security may be enforced at the system pre-boot interface level through OS agent and/or management APIs. Recommendations or suggestions for change/s to more secure system pre-boot interface state configuration/s (i.e., more secure relative to a current system pre-boot interface state configuration) may be offered based on the monitored OS and/or end user usage, and user specific risk context may be included in the system pre-boot interface configuration suggestions/recommendations. Such recommend pre-boot interface state configurations may be based on, for example, predefined security profiles, setting-specific recommendations, and/or custom system pre-boot interface state configuration profiles, e.g., that may be defined to enable specific system devices based on their usage, or that may be defined to enable a group of given system devices based on usage of a particular application that utilizes these given devices. In a further embodiment, recommended system pre-boot interface state configuration changes may be automatically applied with user acknowledgement and awareness.

In one respect, disclosed herein is a method, including: using a pre-boot interface logic to boot an information handling system with a current pre-boot interface configuration to an operating system (OS) runtime session executing on at least one programmable integrated circuit of the information handling system; using the at least one programmable integrated circuit to monitor one or more usage characteristics of the information handling system during the OS runtime; using the at least one programmable integrated circuit to evaluate the monitored usage characteristics against predefined pre-boot interface configuration risk context data to determine a unique pre-boot interface configuration; and then using the at least one programmable integrated circuit to automatically perform only one of the following prior to the next boot of the information handling system: provide a message to a user of the information handling system information informing the user of the determined unique pre-boot interface configuration only if the determined unique pre-boot interface configuration differs from the current pre-boot interface configuration, or provide no message to the user of the information handling system regarding the determined unique pre-boot interface configuration only if the determined unique pre-boot interface configuration is the same as the current pre-boot interface configuration.

In another respect, disclosed herein is an information handling system, including: at least one programmable integrated circuit executing a runtime session of an operating system (OS), the at least one programmable integrated circuit being programmed to monitor one or more usage characteristics of the information handling system during the OS runtime session; and pre-boot interface logic executing on the at least one programmable integrated circuit to boot to the OS runtime session. The at least one programmable integrated circuit may be programmed to evaluate the monitored usage characteristics against predefined pre-boot interface configuration risk context data to determine a unique pre-boot interface configuration, and then automatically perform only one of the following prior to the next boot of the information handling system: provide a message to a user of the information handling system information informing the user of the determined unique pre-boot interface configuration only if the determined unique pre-boot interface configuration differs from the current pre-boot interface configuration, or provide no message to the user of the information handling system regarding the determined unique pre-boot interface configuration only if the determined unique pre-boot interface configuration is the same as the current pre-boot interface configuration.

DESCRIPTION OF ILLUSTRATIVE EMBODIMENTS

Figure 1:
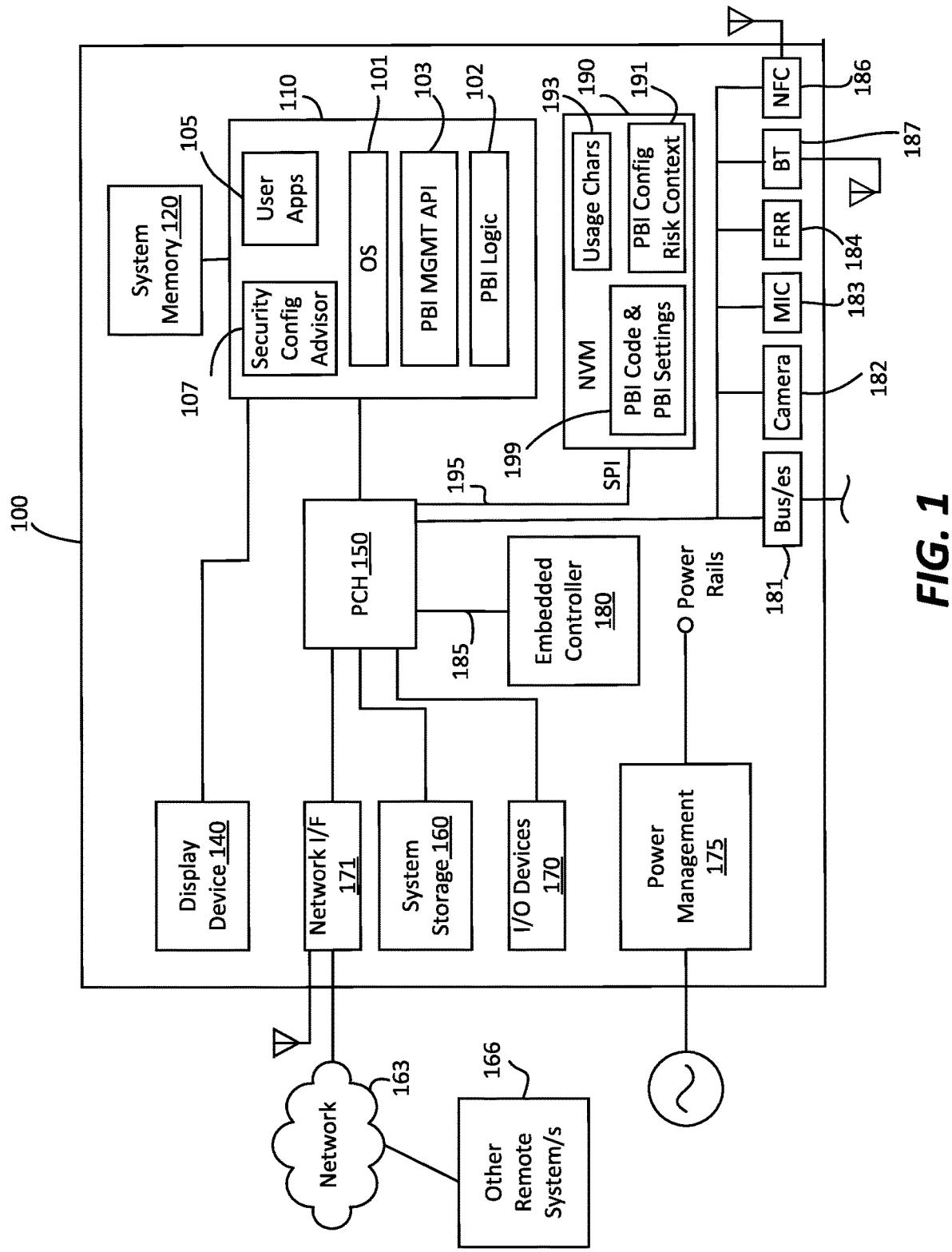
FIG. 1 illustrates a block diagram of an information handling system according to one exemplary embodiment of the disclosed systems and methods.

FIG. 1 is a block diagram of an information handling system 100 (e.g., a desktop computer, laptop computer, tablet computer, etc.) as it may be configured according to one embodiment of the disclosed systems and methods. In this regard, it should be understood that the configuration of FIG. 1 is exemplary only, and that the disclosed methods may be implemented on other types of information handling systems. It should be further understood that while certain devices and components of an information handling system are shown in FIG. 1 for illustrating embodiments of the disclosed systems and methods, the information handling system is not restricted to including only those devices and components shown in FIG. 1 and described below.

As shown in FIG. 1, information handling system 100 may generally include a host programmable integrated circuit 110 that executes an operating system (OS) 101 (e.g., such as Microsoft Windows 10) and pre-boot interface (PBI) logic 102 (e.g., BIOS, UEFI, Coreboot, Linuxboot, etc.) for system 100, and other code such as user software applications 102 (e.g., word processing application, Internet browser, computer game, PDF viewer, spreadsheet application, etc.). Host programmable integrated circuit 110 may be configured to access non-volatile memory 190 (e.g., serial peripheral interface (SPI) Flash memory) to load and boot part of a system pre-boot interface logic 102 from pre-boot interface code (e.g., firmware image) 199 stored on NVM 190. Other non-volatile memory (NVM) devices may be additionally or alternatively present, e.g., including solid state drive/s (SSDs), hard drive/s, etc. Host programmable integrated circuit 110 may include any type of processing device, such as an Intel central processing unit (CPU), an Advanced Micro Devices (AMD) CPU or another programmable integrated circuit. Host programmable integrated circuit 110 is also coupled to system memory 120, which may include, for example, random access memory (RAM), dynamic RAM (DRAM), synchronous DRAM (SDRAM).

In the illustrated embodiment of FIG. 1, host programmable integrated circuit 110 may be coupled to an external or internal (integrated) display device 140 (e.g., LCD or LED display or other suitable display device) depending on the particular configuration of information handling system 100. In such an embodiment, integrated graphics capability may be implemented by host programmable integrated circuit 110 to provide visual images (e.g., a graphical user interface, static images and/or video content) to a system user. However, in other embodiments, a separate programmable integrated circuit (e.g., such as graphics processor unit "GPU") may be coupled between host programmable integrated circuit 110 and display device 140 to provide graphics capability for information handling system 100.

Also shown present in FIG. 1 is local system storage 160 (e.g., one or more media drives, such as hard disk drives, optical drives, NVRAM, Flash memory, solid state drives (SSDs), or any other suitable form of internal or external storage) that is coupled through PCH 150 to provide non-volatile storage for information handling system 100.

In FIG. 1, PCH 150 controls certain data paths and manages information flow between devices and components of the information handling system 100. As such, PCH 150 may include one or more integrated controllers/microcontrollers and/or interfaces for controlling the data paths connecting PCH 150 with host programmable integrated circuit 110, system storage 160, input/output (I/O) devices 170 (e.g., such as one or more of touchpad, keyboard, mouse, touchscreen and associated controllers thereof) forming at least a part of a user interface for the information handling system, network interface (I/F) device 171, embedded controller (EC) 180, and NVM 190 where pre-boot interface code (e.g., firmware image) and pre-boot interface settings 199 (e.g., including current system pre-boot interface configuration information specific to system device/s, software/firmware component/s, and/or port enablement/s, etc.) may be stored together with other information including pre-boot interface configuration risk context data 191 and monitored system usage characteristics 193 described further herein. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

Embedded controller (EC) 180 is coupled to PCH 150 and may be configured to perform functions such as power/thermal system management, etc. EC 180 may also be configured to execute program instructions to boot information handling system 100, load application firmware from NVM 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195 and various interface and logic blocks included within the PCH.

As shown in FIG. 1, external and/or internal (integrated) I/O devices 170 (e.g., a keyboard, mouse, touchpad, touchscreen, etc.) may be coupled to PCH 150 of system 100 to enable a system user to input data and interact with information handling system 100, and to interact with application programs or other software/firmware executing thereon. A network I/F device 171 may be present to enable wired and/or wireless communication with other remote information handling systems 166 via an external network 163 (e.g., the Internet), and in one embodiment may be a network interface controller (NIC) which may communicate with external network 163 across an intervening local area network (LAN), wireless LAN (WLAN), cellular network, etc. Respective different port numbers may be assigned for communication between each of LAN, WLAN, cellular network, etc. and OS 101 and other software and/or firmware executing on host programmable integrated circuit 110.

As further shown in FIG. 1, information handling system 100 may include other system devices which may be coupled to host programmable integrated circuit 110, for example, by PCH 150. Examples of such system devices include, but are not limited to, external data bus connection interfaces 181 (e.g., such as Universal Serial Bus (USB) or Thunderbolt bus interfaces), fingerprint reader (FPR), camera 182, and microphone 183. Such system devices may also include other hardware devices coupled to OS 101, as well as software and/or firmware components executing on programmable integrated circuit 110 to communicate externally to system 100 via an assigned port, e.g., such as RF hardware communication modules (receivers or transceivers) coupled to respective antennas. Specific examples of the latter include, but are not limited to, Bluetooth radio and connection module 187, near field communication (NFC) radio and connection module 186, etc.

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more devices of the information handling system 100, as well as to perform other power-related administrative tasks of the information handling system.

In the embodiment of FIG. 1, host programmable integrated circuit 110 also executes programming of a security configuration advisor 107 that runs on OS 101 to perform automated tasks such as monitoring unique usage characteristics of information handling system 100 (e.g., usage of particular system devices, operating system (OS) usage, and/or usage of applications). Security configuration advisor 107 may also execute to store and update cumulative monitored usage characteristics 193 on NVM 190 over the operating lifetime of information handling system 100. Security configuration advisor 107 also executes to determine a unique and custom system pre-boot interface configuration for the individual information handling system 100 (e.g., pre-boot interface settings specific to system device/s, software/firmware component/s, and/or port enablement/s, etc.) that are based on the stored cumulative monitored unique usage characteristics 193 and that may be implemented to improve security of information handling system 100. To perform this task, security configuration advisor 107 may evaluate the stored cumulative monitored usage characteristics 193 using predefined pre-boot interface configuration risk context data 191 that may be stored and maintained on NVM 190, or alternatively in the cloud on a remote system 166 accessed via network 163 Security configuration advisor 107 may also be executed to recommend or suggest the determined unique system pre-boot interface configuration to a system user as described further herein, and to automatically implement these changes when approved by the system user to pre-boot interface configuration settings 199 via pre-boot interface management application programming interface (API) 103.

Figure 2:
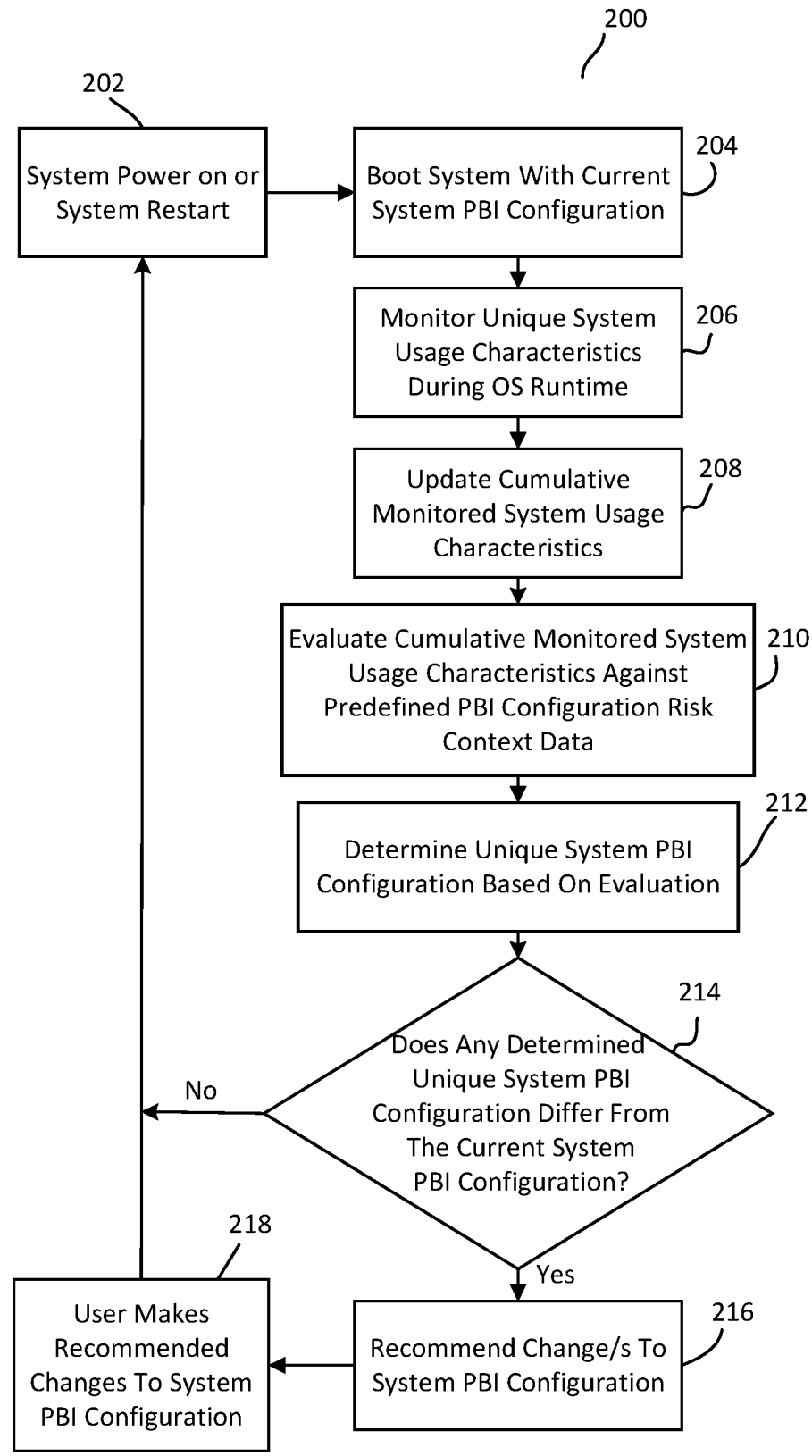
FIG. 2 illustrates methodology according to one exemplary embodiment of the disclosed systems and methods.

FIG. 2 illustrates one exemplary embodiment of methodology 200 that may be implemented by security configuration advisor 107 executing on host programmable integrated circuit 110 of local information handling system 100. As shown methodology 200 starts in step 202 where the system end user powers on or restarts local information handling system 100. Next in step 204, pre-boot interface logic 102 loads the OS bootloader and boots OS 101 to OS runtime for the current user session using the current system pre-boot interface configuration information from pre-boot interface settings 199 stored in NVM 190 (e.g., pre-boot interface settings specific to system device/s, software/firmware component/s, and/or port enablement/s, etc.). The system user then operates the information handling system during the current user session during the following steps 206-218 of methodology 200.

In step 206, security configuration advisor 107 receives system usage data for system 100 during OS runtime from sources such as OS 101 (e.g., status of WiFi radio 171 disabled in OS, and has never been enabled; status of Microphone 183 disabled in OS, and has never been enabled) or other system sources such as a docking station port (e.g., no docking station has ever been connected to system 100), and uses this received usage data to monitor unique system usage characteristics of system 100 during the current user session. Examples of monitored system usage characteristics during the current user session include, but are not limited to, usage (including non-usage) of particular system devices such as camera 182, microphone 183 and fingerprint reader 184; usage (including non-usage) of external data bus connection interface/s 181; usage (including non-usage) of different individual port numbers that are assigned for external communication via network interface 171 and/or radio frequency (RF) hardware communication modules such as Bluetooth module 185, near field communication module 186, etc. In step 208, these currently monitored usage characteristics of step 206 may be used to update (e.g., added to) cumulative monitored usage characteristic information 193 (e.g., usage log/s) that includes usage characteristics monitored during previous OS runtime sessions that may be stored by security configuration advisor 107 on NVM 190 in step 208 as shown in FIG. 1.

Next, in step 210, security configuration advisor 107 executes to retrieve and evaluate the cumulative monitored usage characteristic information 193 that is stored on NVM 190. This evaluation of step 210 may be performed by security configuration advisor 107 continuously during a given current user session, although it is alternatively possible that step 210 and the following steps may be performed at predesignated time/s, e.g., such as only performed at the end of a current OS runtime user session when a user shuts down or reboots information handling system 100.

During step 210, security configuration advisor 107 accesses or retrieves pre-boot interface configuration risk context data 191 on NVM 190 to evaluate the retrieved cumulative monitored usage characteristic information 193. Table 1 below is an example of pre-boot interface configuration risk context data 191 as it may be stored on NVM 190 in the form of a predefined lookup table, e.g., that is provided at system manufacture or assembly by a system manufacturer or vendor, and/or as it may be updated by system software/firmware updates received across network 163 from an update server. It is also possible that in one embodiment a user of system 100 may be given the ability to make changes to the data of Table 1, e.g., including changes to the defined risk and configuration action data that is described further herein.

In Table 1, configuration actions (e.g., enable or disable) are each defined as a function of usage level (e.g., no usage, low usage or high usage) and risk level defined for each of a number of system devices. It will be understood that the risk context data of Table 1 is exemplary only, and that risk context data may contain additional and/or alternative system devices. Moreover, the number of usage levels may be greater or less than three, and/or particular configuration actions corresponding to any given usage level and/or risk level may vary for any given system device and component listed below.

TABLE 1

Pre-Boot Interface Configuration Risk Context Data

| System Devices (Includes Discrete Hardware Devices, Interfaces and Ports) | Defined Risk Level | Action for Monitored No Usage | Action for Monitored Low (Infrequent) Usage | Action for Monitored High (Frequent) Usage |
|---|---|---|---|---|
| Thunderbolt Bus Interface | High | Disable | Disable | Enable |
| USB Bus Interface | Medium | Disable | Enable | Enable |
| Camera | High | Disable | Disable | Enable |
| Microphone | High | Disable | Disable | Enable |
| Fingerprint Reader | Low | Disable | Enable | Enable |
| WiFi Port | High | Disable | Disable | Enable |
| LAN Port | High | Disable | Disable | Enable |
| Bluetooth Port | Medium | Disable | Enable | Enable |
| Near Field Communication Port | Medium | Disable | Enable | Enable |
| User I/O Devices | Low | Disable | Enable | Enable |

Still referring to Table 1, the "Defined Risk Level" (e.g., High, Medium or Low) in each entry of the first column may in one embodiment correspond to a predefined relative level of risk to user privacy and/or data security posed by a particular device of system 100. For example, camera 182 and microphone 183 may each be classified as posing a relatively high level of risk to the privacy of the system user due to potential for malicious actors to gain control of these devices without the knowledge of the system user.

In one embodiment, a risk level may be defined based at least in part on a particular hierarchical privilege level assigned by OS 101 to a discrete hardware device, system interface, or system port. In this regard, hierarchical privilege level of a given device may be used by OS 101 to define the level of trust to access system resources that is assigned to a given discrete hardware device, system interface, or system port (e.g., with highest privilege providing greatest trust and greatest access to system resources such as CPU 110 and system memory 120, and lowest privilege providing least trust and least access to system resources such as CPU 110 and system memory 120). In such an embodiment, a relatively higher risk level may be assigned to a first given device having a relatively higher hierarchical privilege level to access relatively more system resources, while a relatively lower risk level may be assigned to a second given device having a relatively lower hierarchical privilege level to access relatively less system resources.

For example, a WiFi port (to a WiFi radio module) of network interface 171 may be classified as posing a relatively high level of risk to system data security and privacy of the system user due to potential for malicious actors to intercept and monitor WiFi communications. On the other hand, user I/O devices 170 such as a touchpad may be perceived as posing a relatively low level of risk to both user privacy and data security due to low potential for exploitation by malicious actors. Other devices may be perceived as posing a moderate or medium risk to user privacy and/or data security. For example, USB bus connection interface port 181 may be perceived as posing a moderate or medium risk to data security, whereas Thunderbolt bus connection interface port 181 may be perceived as posing high risk to data security. It will be understood that the three separate risk levels of Table 1 is exemplary only, and that any other number of separate risk levels may be defined as desired or needed for a given system configuration.

As further shown in Table 1, different configuration actions may be predefined to correspond to three different categories of monitored usage levels (e.g., the "No Usage", "Low Usage" and "High Usage" columns of Table 1) for each of the listed system devices of Table 1. In the exemplary embodiment of Table 1, "No Usage" refers to a condition in which the cumulative usage characteristics 193 maintained on NVM 190 indicate that a given system device has never been used on the individual information handling system 100 since the system was first activated by the system end user. "Low Usage" in Table 1 refers to a condition in which the cumulative usage characteristics 193 maintained on NVM 190 indicate that a given system device has been used infrequently on the individual information handling system 100, for example, the device has been used one or more times on the system since the system was first activated by the system end user, but the amount of time since the device was last used on the system is greater than or equal to a predefined threshold time period length (e.g., such as threshold of 35 days or more) stored on NVM 190. "High Usage" in Table 1 refers to a condition in which the cumulative usage characteristics 193 maintained on NVM 190 indicate that a given system device has been used frequently on the individual information handling system 100, for example, where the amount of time since the device was last used on the system is less than the predefined threshold time period length (e.g., less than 35 days). It will be understood that a time period of 35 days is exemplary only, and that a threshold minimum number of days may be defined as any other number of greater or lesser days as desired or needed for a given system configuration, and/or that time period values may be measured and expressed in units other than days.

In the exemplary embodiment of Table 1, a corresponding configuration action is included in each entry of the rightmost three columns, e.g., as a function of usage level (e.g., no usage, low usage or high usage) and risk level (e.g., High, Medium or Low) defined for each of the listed system devices and components. As shown, a risk-based configuration action profile may be predefined for each of the three different defined risk levels. For example, in the embodiment of Table 1, an "Enable" configuration action is only recommended for a high risk level device that has a monitored "High Usage" status, with a "Disable" configuration action being recommended for a high risk level device that has a monitored "Low Usage" or "No Usage" status. In contrast, a "Disable" configuration action is only recommended for a medium risk level device that has a monitored "No Usage" status, with an "Enable" configuration action being recommended for a medium risk level device that has a monitored "Low Usage" or "High Usage" status. An "Enable" configuration action is recommended in all monitored usage cases (e.g., "High Usage", "Low Usage" and "No Usage" status) for a low risk level device. The particular risk-based configuration action profiles of Table 1 are exemplary only, with other combinations of different numbers and types of risk levels and/or configuration actions being possible in other embodiments.

In another exemplary embodiment, pre-boot interface configuration risk context data 191 may group interdependent system devices and software/firmware components (e.g., user applications) together into an interdependent-based configuration action profile. For example, system camera 182 and system microphone 183 may be grouped together with one or more associated user applications that utilize these system devices, e.g., such as a video chat or teleconference user application (e.g. Skype, Zoom, etc.). In this example, configuration actions (e.g., "Enable" or "Disable") for each of system camera 182 and system microphone 183 may be conditioned on the current status of any system user application/s (e.g., video chat or teleconference user application) with which these system devices are grouped. In this case, an "Enable" configuration action is indicated as long as grouped system devices (e.g., system camera 182 and system microphone 183) are grouped together with at least one user application (e.g., Skype or Zoom) that is currently installed on system 100. However, a configuration action of "Disable" is indicated for these devices when they are no longer grouped together with any system user application that is currently installed on system 100, e.g., such in a case where all grouped software applications are uninstalled from the system.

Returning now to step 210 of FIG. 2, security configuration advisor 107 evaluates (e.g., compares) cumulative monitored system usage characteristics on NVM 190 relative to (or against) pre-boot interface configuration risk context data 191. In the case of the pre-boot interface configuration risk context data 191 of Table 1, security configuration advisor 107 retrieves and analyzes the cumulative usage data 193 for each system device and component listed in Table 1 to determine whether each system device and component has had no usage ever, has had low usage (e.g., usage has occurred in the past but it has been greater than or equal to the threshold minimum number of days since the last use) or has had high usage (e.g., usage has occurred in the past and it has been less than the threshold minimum number of days since the last use).

Once the category of cumulative usage (no usage, low usage or high usage) has been determined in step 210 for each given device, then security configuration advisor 107 accesses Table 1 of pre-boot interface configuration risk context data 191 in step 212 to determine a configuration action (enable or disable) for each given device from the table entry corresponding to that given device and the determined category of cumulative usage (no usage, low usage or high usage) that was determined in step 210. As an example, if the system user has never connected a device to a an external Thunderbolt bus interface port 181 (which is defined as high risk in Table 1), then security configuration advisor 107 determines a unique system pre-boot interface configuration action of "Disable" corresponding to no usage of Thunderbolt bus connection interface port 181 from Table 1. If the system user only infrequently uses (e.g., 35 days or more since last camera use) the system camera 182 (which is defined as high risk in Table 1), then security configuration advisor 107 determines a unique system pre-boot interface configuration action of "Disable" corresponding to low usage of camera 182 from Table 1. A similar determination may be made for each of the other system devices that have a corresponding entry in Table 1.

Next, in step 214, security configuration advisor 107 determines if the unique system pre-boot interface configuration action determined in step 212 for any of the system devices differs from the current system pre-boot interface setting 199 stored on NVM 190 for that same system device. If not (i.e., all unique system pre-boot interface configuration actions determined in step 212 match the current system pre-boot interface settings 199), then methodology 200 returns to step 202 where information handling system 100 boots up using the unchanged current system pre-boot interface settings 199 for all system devices the next time that system 100 is powered on or restarted.

However, if in step 214 security configuration advisor 107 determines that the unique system pre-boot interface configuration action determined in step 212 for any one or more of the system devices differs from the current system pre-boot interface setting 199 stored on NVM 190 for that same system device. If so (i.e., any one or more unique system pre-boot interface configuration actions determined in step 212 do not match the current system pre-boot interface settings 199), then methodology 200 proceeds to step 216 where security configuration advisor 107 recommends to the system user a change to the current system pre-boot interface settings 199 for those system devices having current pre-boot interface settings 199 that do not match the recommended unique system pre-boot interface configuration actions determined in step 212. Such a recommendation may be communicated in step 216 to the user in any suitable manner, e.g., such as by an audio or displayed message to the human system user. For example, in one embodiment such a recommendation may be communicated in step 216 to the human system user by displaying an interactive pop-up window 300 of FIG. 3 on display device 140 that identifies each affected system device and also the recommended unique system pre-boot interface configuration action for that system device. The recommendation may be provided to the human system user at any time, but in one embodiment may be automatically displayed when the human system user enters a command for shut down or restart of information handling system 100. In another embodiment, the recommendation may be automatically displayed at system startup, e.g., after booting to OS 101 after executing one iteration of methodology 200.

Figure 3:
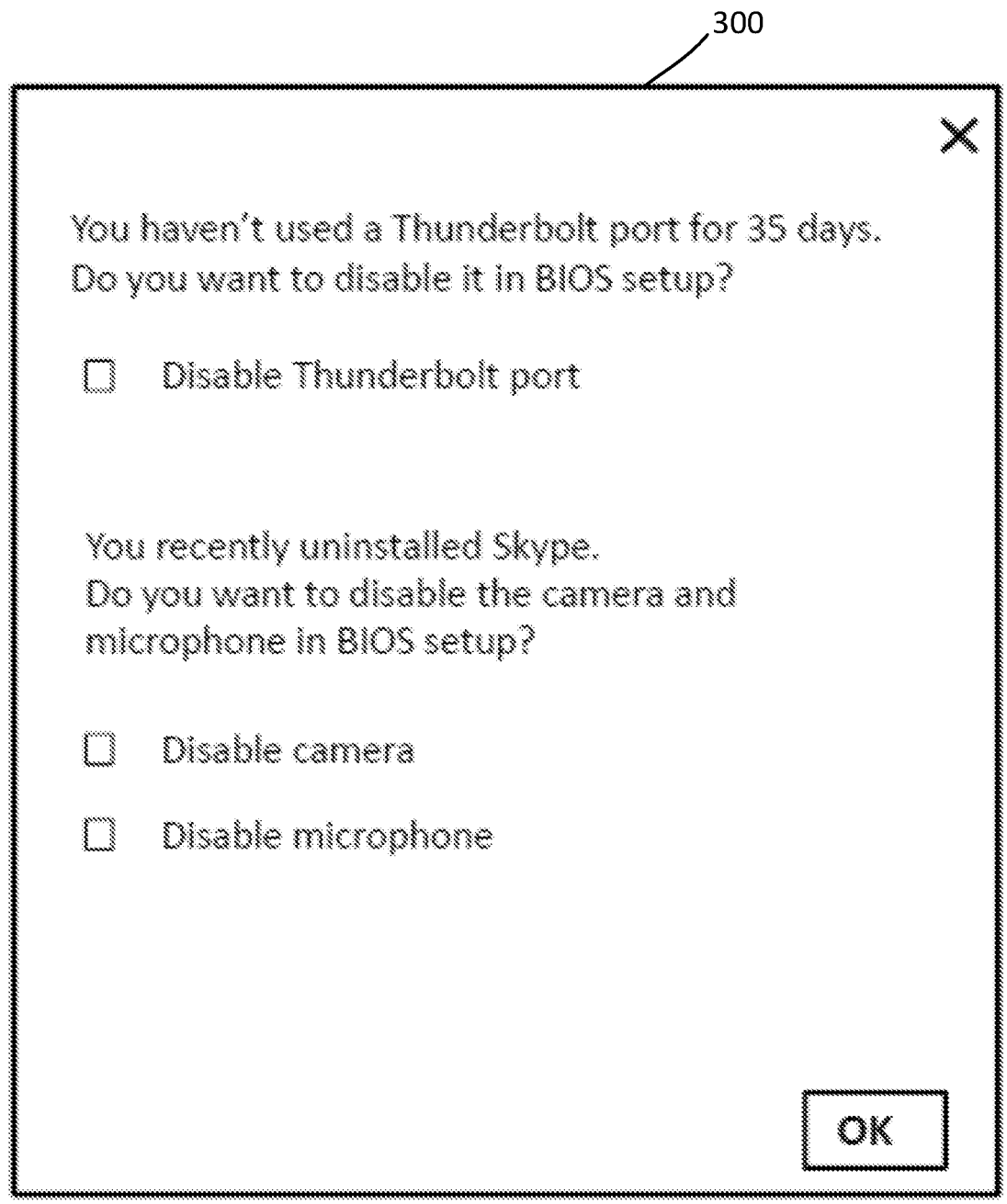
FIG. 3 illustrates an interactive pop-up window displayed according to one exemplary embodiment of the disclosed systems and methods.

FIG. 3 illustrates one exemplary embodiment of an interactive pop-up window or "toast" notification 300 that may be automatically displayed on display device 140 by security configuration advisor 107 to recommend or otherwise advise a change to the current system pre-boot interface settings 199, which in this example are system BIOS settings. In the example of FIG. 3, cumulative monitored usage characteristics 193 indicate that Thunderbolt bus connection interface port 181 has not been used for 35 days, which meets the threshold minimum number of days (e.g., 35 days in this example) for low or infrequent usage. Thus, in this example, security configuration advisor 107 responds by displaying the following recommendation message to the system user within pop-up window 300: "You haven't used a Thunderbolt port for 35 days. Do you want to disable it in BIOS setup?" Security configuration advisor 105 also displays a checkbox within pop-up window 300 that presents the system user with the option to select to perform the recommended configuration action by checking a checkbox, in this case: "☐ Disable Thunderbolt port".

In the exemplary embodiment of FIG. 3, interactive pop-up window 300 also includes a recommendation message based on a determination in step 210 from cumulative monitored system usage characteristics 193 that an existing software/firmware component (e.g., in this case a Skype teleconference user application) that is part of a given interdependent-based configuration action profile of pre-boot interface configuration risk context data 191 has been uninstalled from system 100 by the system user. Based on this determination in step 210, security configuration advisor 107 then also determines in step 210 whether any associated enabled system devices (e.g., in this case camera 182 and microphone 183) of the same given interdependent-based configuration action profile are associated with any other currently-installed existing software/firmware component of another interdependent-based configuration action profile of pre-boot interface configuration risk context data 191. If not, then security configuration advisor 107 determines a unique system pre-boot interface configuration action in step 212 to disable the associated system devices (e.g., camera 182 and microphone 183), and security configuration advisor 107 then determines if this unique system pre-boot interface configuration action determined in step 212 differs from the current system pre-boot interface setting 199 stored on NVM 190 for one or more of the associated system device/s in a manner as previously described for step 214.

FIG. 3 illustrates the case where the answer to step 214 is "Yes", and interactive pop-up window 300 also accordingly displays the above-described recommendation message illustrated in FIG. 3: "You recently uninstalled Skype. Do you want to disable the camera and microphone in BIOS setup?", along with user checkboxes corresponding to user selections to "Disable Camera" and "Disable microphone" as shown in FIG. 3. It will be understood that the interactive pop-up window 300 is only exemplary, and that any other form of message informing the user of the determined unique pre-boot interface configuration may be provided to a system human user in step 216, e.g., such as a pop-up text message similar to pop-up window 300 but displayed without interactive check boxes, a speech-synthesized audio message advising the user of recommended changes to the current system pre-boot interface settings 199, etc.

Step 216 then proceeds to step 218, where the system user may select to perform any or all of the recommended configuration actions by checking the desired checkbox/es displayed in step 216. When any one or more checkboxes are selected by the system user in step 218, security configuration advisor 107 communicates this selection to pre-boot interface management API 103 which updates the current system pre-boot interface configuration settings 199 so as to implement only those user-selected recommended user configuration actions of step 218 during next system boot of step 204, after which methodology 200 repeats as before (i.e., without implementing any displayed recommended user configuration actions of step 216 that are not selected by the system user in step 218). In the case where a non-interactive message is provided to the user in step 216, then the user may decide to separately access system settings from a separate system menu to perform configuration change actions based on the recommendation or other type of message provided in step 216.

It will be understood that the example recommended configuration actions of FIG. 3 are exemplary only, and that recommended configuration actions for other system devices may additionally or alternatively be recommended in step 216. Further, it will understood that the particular combination of steps of FIG. 2 are exemplary only, and that other combinations of additional, fewer, and/or alternative steps may be employed that are suitable for monitoring unique usage characteristics of an individual information handling system, and for determining and implementing a unique system pre-boot interface configuration for the individual information handling system that is based on these monitored unique usage characteristics.

It will also be understood that one or more of the tasks, functions, or methodologies described herein (e.g., including those described herein for components 101, 102, 103, 105, 107, 110, 175, 180, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
using a pre-boot interface logic to boot an information handling system with a current pre-boot interface configuration to an operating system (OS) runtime session of an OS executing on at least one programmable integrated circuit of the information handling system;
using the at least one programmable integrated circuit to monitor one or more usage characteristics of the information handling system during the OS runtime;
using the at least one programmable integrated circuit to evaluate the monitored usage characteristics of each given one of multiple system devices of the information handling system against predefined pre-boot interface configuration risk context data defined for each given one of the multiple system devices of the information handling system to determine a unique pre-boot interface configuration based on an enable or disable configuration action of the predefined pre-boot interface configuration risk context data that is specified for each given one of the multiple system devices of the information handling system as a function of both the monitored usage characteristics of the given one of the multiple system devices and a predefined risk level of the given one of the multiple system devices; and then using the at least one programmable integrated circuit to automatically perform only one of the following prior to the next boot of the information handling system:

provide a message to a user of the information handling system information informing the user of the determined unique pre-boot interface configuration only if the determined unique pre-boot interface configuration differs from the current pre-boot interface configuration, or provide no message to the user of the information handling system regarding the determined unique pre-boot interface configuration only if the determined unique pre-boot interface configuration is the same as the current pre-boot interface configuration.

2. The method of claim 1, where the pre-boot interface logic is basic input/output system (BIOS), unified extensible firmware interface (UEFI), Coreboot or Linuxboot.

3. The method of claim 1, where the monitored usage characteristics of the information handling system comprise at least one of monitored usage of a data bus port of the information handling system, monitored usage of a camera of the information handling system, monitored usage of a local area network (LAN) port of the information handling system, monitored usage of a wireless LAN port of the information handling system, monitored usage of a microphone of the information handling system, monitored usage of a Bluetooth connection port of the information handling system, monitored usage of a near field communication (NFC) connection port of the information handling system, monitored usage of a fingerprint reader (FPR) of the information handling system, or monitored usage of a touchpad of the information handling system.

4. The method of claim 1, where using the at least one programmable integrated circuit to provide the message to the user of the information handling system comprises providing a recommendation to the user of the information handling system to change the current pre-boot interface configuration to the determined unique pre-boot interface configuration.

5. The method of claim 1, where using the at least one programmable integrated circuit to provide the message to the user of the information handling system comprises displaying an interactive pop-up window on a display device of the information handling system, the displayed interactive pop-up window including one or more recommended unique system pre-boot interface configuration actions that change the current pre-boot interface configuration for one or more system devices of the information handling system; and where the method further comprises:

using the at least one programmable integrated circuit to accept input from the user entered on the displayed interactive pop-up window to select to implement one or more of the displayed recommended unique system pre-boot interface configuration actions.

6. The method of claim 5, further comprising using the at least one programmable integrated circuit to update the current pre-boot interface configuration to implement the selected one or more displayed recommended unique system pre-boot interface configuration actions at the next system boot so as to change the current pre-boot interface configuration to the determined unique pre-boot interface configuration for the one or more system devices at the next system boot.

7. The method of claim 1, where using the at least one programmable integrated circuit to provide the message to the user of the information handling system comprises providing the message to the user of the information handling system at the end of the OS runtime user session; and where the method further comprises using the at least one programmable integrated circuit to:

accept input from the user before the end of the OS runtime session to select at least a determined unique system pre-boot interface configuration for at least one system device of the information handling system; and then change the current pre-boot interface configuration for the at least one system device to the selected determined unique pre-boot interface configuration for the at least one system device at the next system boot.

8. The method of claim 1, where the predefined pre-boot interface configuration risk context data is stored on non-volatile memory of the information handling system; and where the method further comprises using the at least one programmable integrated circuit to add the monitored usage characteristics to cumulative monitored usage characteristic information that includes usage characteristics monitored during previous OS runtime sessions that is stored on a non-volatile memory of the information handling system; and where using the at least one programmable integrated circuit to evaluate the monitored usage characteristics comprises:

then using the at least one programmable integrated circuit to retrieve the cumulative monitored usage characteristic information from the non-volatile memory and to retrieve the predefined pre-boot interface configuration risk context data from the non-volatile memory, and using the at least one programmable integrated circuit to compare the cumulative monitored usage characteristics against the predefined pre-boot interface configuration risk context data to determine the unique pre-boot interface configuration.

9. The method of claim 1, where the predefined pre-boot interface configuration risk context data comprises a look up table stored on non-volatile memory of the information handling system, the look up table including configuration actions that are defined as a function of both usage level and risk level defined for each one of a number of system devices of the information handling system.

10. The method of claim 9, where the configuration actions defined in the look up table for each given system device comprise enable and disable; and where the risk level defined in the look up table for each given system device is defined based at least in part on a hierarchical privilege level assigned to the given system device by the OS.

11. The method of claim 10, where there are multiple usage levels defined in the look up table for each given system device, the defined multiple usage levels comprising a first usage level corresponding to a first system device that has never been used on the individual information handling system since the system was first activated by the user of the information handling system user, a second and different usage level corresponding to a second system device that has been used at least one time but the amount of time since the second system device was last used on the system is greater than or equal to a predefined threshold time period length, and a third and different usage level corresponding to a third system device that has been used and the amount of time since the third system device was last used on the system is less than the predefined threshold time period.

12. An information handling system, comprising:
  at least one programmable integrated circuit executing a runtime session of an operating system (OS), the at least one programmable integrated circuit being programmed to monitor one or more usage characteristics of the information handling system during the OS runtime session; and
  pre-boot interface logic executing on the at least one programmable integrated circuit to boot to the OS runtime session;
  where the at least one programmable integrated circuit is programmed to evaluate the monitored usage characteristics of each given one of multiple system devices of the information handling system against predefined pre-boot interface configuration risk context data defined for each given one of the multiple system devices of the information handling system to determine a unique pre-boot interface configuration based on an enable or disable configuration action of the predefined pre-boot interface configuration risk context data that is specified for each given one of the multiple system devices of the information handling system as a function of both the monitored usage characteristics of the given one of the multiple system devices and a predefined risk level of the given one of the multiple system devices, and then automatically perform only one of the following prior to the next boot of the information handling system:
    provide a message to a user of the information handling system information informing the user of the determined unique pre-boot interface configuration only if the determined unique pre-boot interface configuration differs from the current pre-boot interface configuration, or
    provide no message to the user of the information handling system regarding the determined unique pre-boot interface configuration only if the determined unique pre-boot interface configuration is the same as the current pre-boot interface configuration.

13. The information handling system of claim 12, where the pre-boot interface logic is basic input/output system (BIOS), unified extensible firmware interface (UEFI), Coreboot or Linuxboot.

14. The information handling system of claim 12, where the monitored usage characteristics of the information handling system comprise at least one of monitored usage of a data bus port of the information handling system, monitored usage of a camera of the information handling system, monitored usage of a local area network (LAN) port of the information handling system, monitored usage of a wireless LAN port of the information handling system, monitored usage of a microphone of the information handling system, monitored usage of a Bluetooth connection port of the information handling system, monitored usage of a near field communication (NFC) connection port of the information handling system, monitored usage of a fingerprint reader (FPR) of the information handling system, or monitored usage of a touchpad of the information handling system.

15. The information handling system of claim 12, where the at least one programmable integrated circuit is programmed to provide the message to the user of the information handling system as a recommendation to the user of the information handling system to change the current pre-boot interface configuration to the determined unique pre-boot interface configuration.

16. The information handling system of claim 12, further comprising a display device coupled to the at least one programmable integrated circuit; and where the at least one programmable integrated circuit is programmed to:
  provide the message to the user of the information handling system by displaying an interactive pop-up window on the display device, the displayed interactive pop-up window including one or more recommended unique system pre-boot interface configuration actions that change the current pre-boot interface configuration for one or more system devices of the information handling system; and
  accept input from the user entered on the displayed interactive pop-up window to select to implement one or more of the displayed recommended unique system pre-boot interface configuration actions.

17. The information handling system of claim 16, where the at least one programmable integrated circuit is programmed to update the current pre-boot interface configuration to implement the selected one or more displayed recommended unique system pre-boot interface configuration actions at the next system boot so as to change the current pre-boot interface configuration to the determined unique pre-boot interface configuration for the one or more system devices at the next system boot.

18. The information handling system of claim 12, where the at least one programmable integrated circuit is programmed to:
  provide the message to the user of the information handling system at the end of the OS runtime user session;
  accept input from the user before the end of the OS runtime session to select at least a determined unique system pre-boot interface configuration for at least one system device of the information handling system; and
  then change the current pre-boot interface configuration for the at least one system device to the selected determined unique pre-boot interface configuration for the at least one system device at the next system boot.

19. The information handling system of claim 12, further comprising non-volatile memory couple to the at least one programmable integrated circuit, the predefined pre-boot interface configuration risk context data being stored on the non-volatile memory of the information handling system; and where the at least one programmable integrated circuit is programmed to:
  add the monitored usage characteristics to cumulative monitored usage characteristic information that is stored on the non-volatile memory of the information handling system, the cumulative monitored usage characteristic information including usage characteristics monitored during one or more previous OS runtime sessions;
  then retrieve the cumulative monitored usage characteristic information and the predefined pre-boot interface configuration risk context data from the non-volatile memory, and
  compare the cumulative monitored usage characteristics against the predefined pre-boot interface configuration risk context data to determine the unique pre-boot interface configuration.

20. The information handling system of claim 12, where the predefined pre-boot interface configuration risk context data comprises a look up table stored on non-volatile memory of the information handling system, the look up table including configuration actions that are defined as a function of both usage level and risk level defined for each one of a number of system devices of the information handling system; where the configuration actions defined in the look up table for each given system device comprise enable and disable; and where the risk level defined in the look up table for each given system device is defined based at least in part on a hierarchical privilege level assigned to the given system device by the OS.

21. The information handling system of claim 20, where there are multiple usage levels defined in the look up table for each given system device, the defined multiple usage levels comprise a first usage level corresponding to a first system device that has never been used on the individual information handling system since the system was first activated by the user of the information handling system user, a second and different usage level corresponding to a second system device that has been used at least one time but the amount of time since the second system device was last used on the system is greater than or equal to a predefined threshold time period length, and a third and different usage level corresponding to a third system device that has been used and the amount of time since the third system device was last used on the system is less than the predefined threshold time period.

22. The method of claim 1, where the using the at least one programmable integrated circuit to evaluate the monitored usage characteristics against predefined pre-boot interface configuration risk context data to determine a unique pre-boot interface configuration further comprises using the at least one programmable integrated circuit to continuously evaluate the monitored usage characteristics against predefined pre-boot interface configuration risk context data to determine a unique pre-boot interface configuration.

23. The method of claim 1, where an enable configuration action specified by the predefined pre-boot interface configuration risk context data for a system device having a higher risk level requires a higher monitored system device usage level than is required by an enable configuration action specified by the predefined pre-boot interface configuration risk context data for a system device having a lower risk level than the higher risk level.

24. The method of claim 23, where a disable configuration action specified by the predefined pre-boot interface configuration risk context data for the system device having the lower risk level requires a lower monitored system device usage level than is required by a disable configuration action specified by the predefined pre-boot interface configuration risk context data for the system device having the higher risk level.

25. The method of claim 23, where the predefined pre-boot interface configuration risk context data defines a higher risk level for a WiFi port system device of the information handling system and defines a lower risk level for a user input/output (I/O) system device of the information handling system; and where an enable configuration action specified by the predefined pre-boot interface configuration risk context data for the WiFi port system device having the higher risk level requires a higher monitored system device usage level for the WiFi port system device than is required by an enable configuration action specified by the predefined pre-boot interface configuration risk context data for the user I/O system device having the lower risk level than the higher risk level.

26. The method of claim 1, where the amount of monitored system device usage required by the predefined pre-boot interface configuration risk context data for an enable configuration action for a given system device increases with increasing risk level of the given system device.

27. The method of claim 1, where the predefined pre-boot interface configuration risk context data defines an interdependent configuration action profile for a group of at least one interdependent system device with at least one interdependent software or firmware component that uses the at least one interdependent system device; and where the interdependent enable or disable configuration action is conditioned on the current status of the at least one interdependent software or firmware component such that an enable configuration action is specified for the at least one interdependent system device when the at least one interdependent software of firmware component is currently installed on the information handling system, and such that a disable configuration action is specified for the at least one interdependent system device when the at least one interdependent software of firmware component is not currently installed on the information handling system.

28. The information handling system of claim 12, where the at least one programmable integrated circuit is programmed to continuously evaluate the monitored usage characteristics against predefined pre-boot interface configuration risk context data to determine a unique pre-boot interface configuration.

29. The information handling system of claim 12, where an enable configuration action specified by the predefined pre-boot interface configuration risk context data for a system device having a higher risk level requires a higher monitored system device usage level than is required by an enable configuration action specified by the predefined pre-boot interface configuration risk context data for a system device having a lower risk level than the higher risk level.

30. The information handling system of claim 29, where a disable configuration action specified by the predefined pre-boot interface configuration risk context data for the system device having the lower risk level requires a lower monitored system device usage level than is required by a disable configuration action specified by the predefined pre-boot interface configuration risk context data for the system device having the higher risk level.

31. The information handling system of claim 29, where the predefined pre-boot interface configuration risk context data defines a higher risk level for a WiFi port system device of the information handling system and defines a lower risk level for a user input/output (I/O) system device of the information handling system; and where an enable configuration action specified by the predefined pre-boot interface configuration risk context data for the WiFi port system device having the higher risk level requires a higher monitored system device usage level for the WiFi port system device than is required by an enable configuration action specified by the predefined pre-boot interface configuration risk context data for the user I/O system device having the lower risk level than the higher risk level.

32. The information handling system of claim 12, where the amount of monitored system device usage required by the predefined pre-boot interface configuration risk context data for an enable configuration action for a given system device increases with increasing risk level of the given system device.

33. The information handling system of claim 12, where the predefined pre-boot interface configuration risk context data defines an interdependent configuration action profile for a group of at least one interdependent system device with at least one interdependent software or firmware component that uses the at least one interdependent system device; and where the interdependent enable or disable configuration action is conditioned on the current status of the at least one interdependent software or firmware component such that an enable configuration action is specified for the at least one interdependent system device when the at least one interdependent software of firmware component is currently installed on the information handling system, and such that a disable configuration action is specified for the at least one interdependent system device when the at least one interdependent software of firmware component is not currently installed on the information handling system.

* * * * *